UNITED STATES PATENT OFFICE 2,029,006

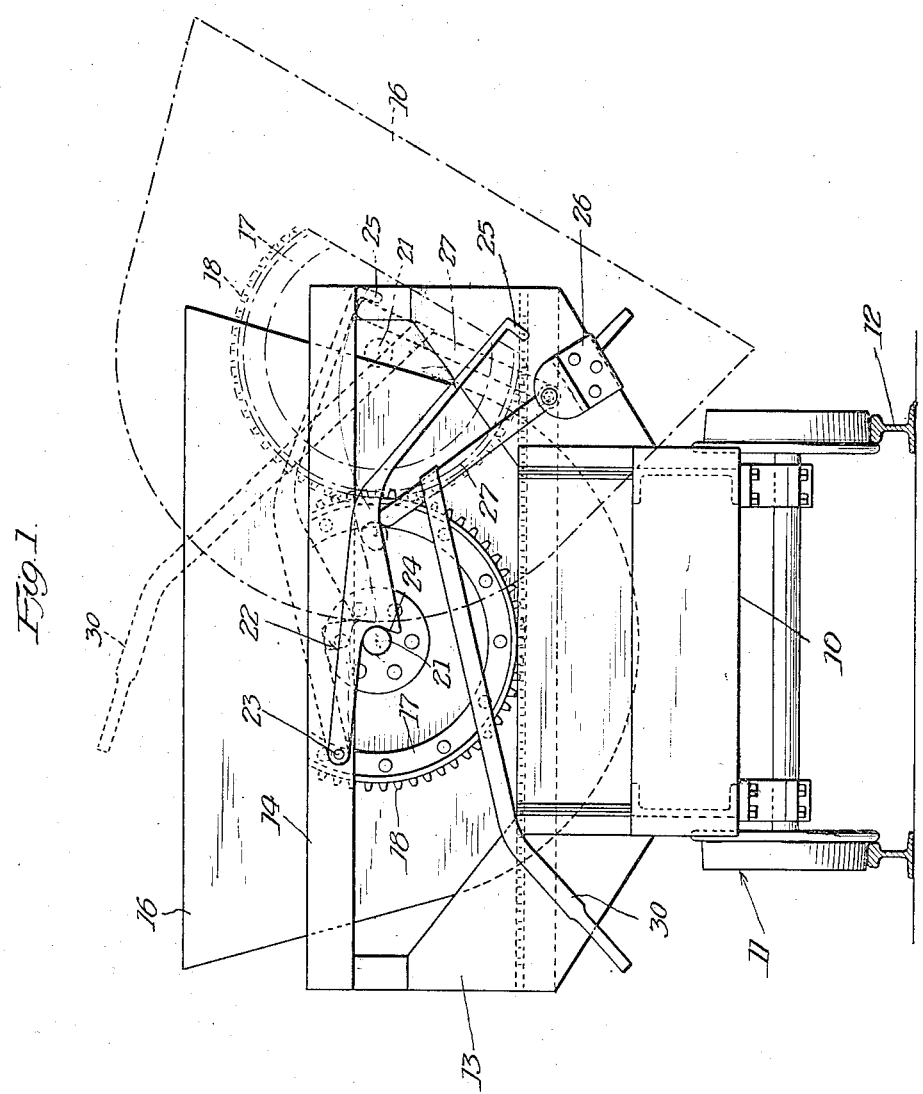

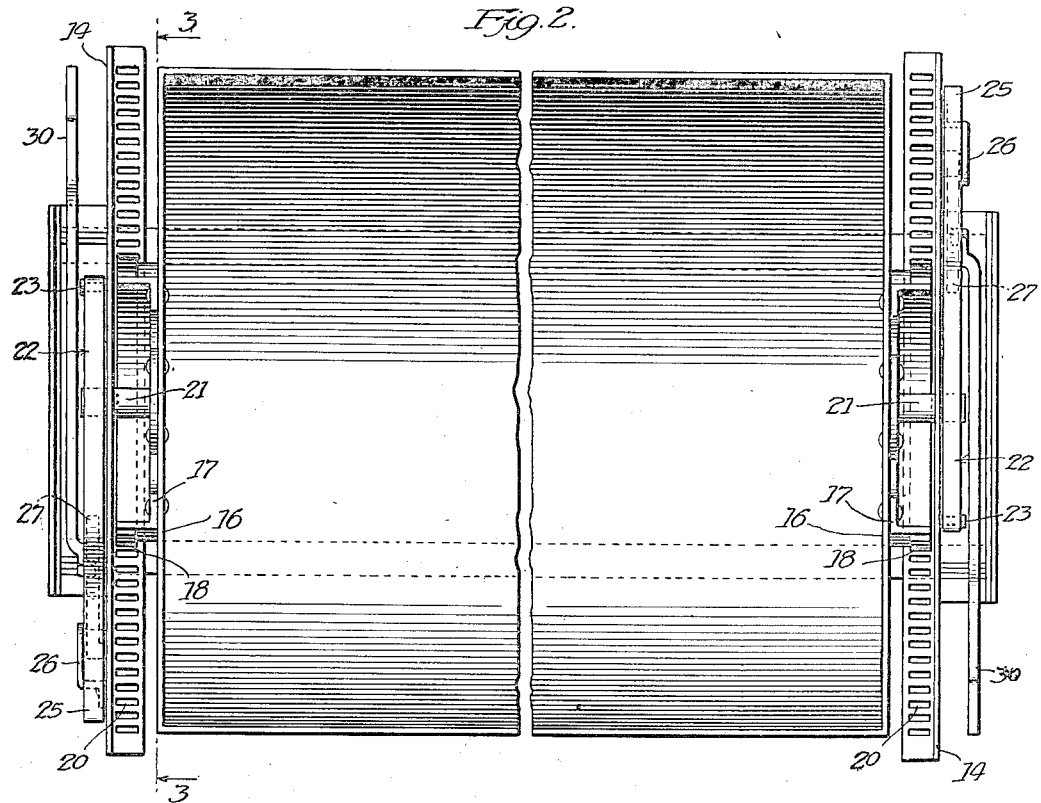
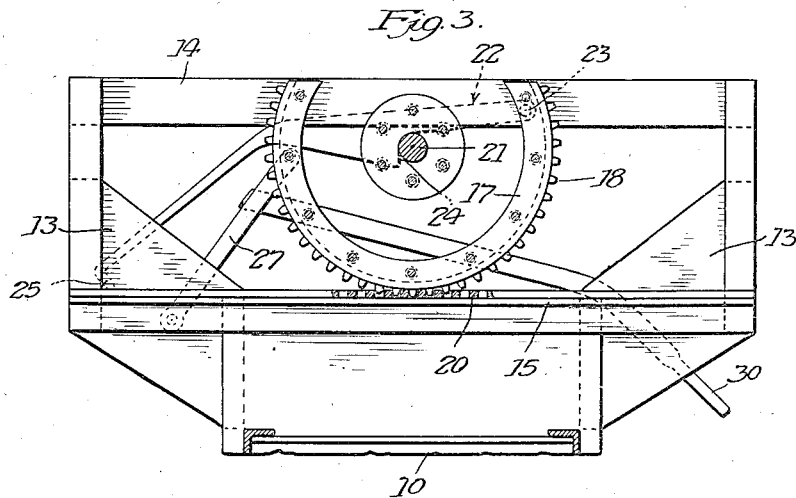

LATCHING AND RIGHTING MECHANISM FOR DUMP CARS

Fred R. Wedlake and Hannibal Hart, Eveleth, Minn.

Application March 6, 1933, Serial No. 659,894

16 Claims. (Cl. 105—264)

The invention relates to dump cars and has reference particularly to improvements in mechanism for tilting and righting the car body and for latching the body in upright position.

An object of the invention is to provide cars such as used in transporting ore with improved mechanism for tilting and righting the car body and wherein the actuating lever will control the latching and releasing of the upright car body and also function as means for righting the car body from its discharge or dump position.

A more specific object of the invention is to provide dump cars having a rocking car body with latching and righting mechanism therefor which will effect a locking of the body in upright position and a righting of the same from a dump position by means of end projections on the body which have movement in a horizontal plane during the dumping and righting operations of the car body.

A further object is to provide improved means for unlatching dump cars which will be operable from an end of the car, depending on which side the discharge is to take place, and which will also operate to right the car body while retaining full control over the latching means therefor.

With these and various other objects in view, the invention may consist of certain novel features of construction and operation as will be more fully described and particularly pointed out in the specification, drawings and claims appended hereto.

In the drawings which illustrate an embodiment of the device and wherein like reference characters are used to designate like parts—

Figure 1 is an end view of a dump car embodying the principles of the present invention and showing in dotted lines the dump position of the car body and actuating mechanism;

Figure 2 is a top plan view of the dump car shown in Figure 1; and

Figure 3 is a transverse sectional view taken on line 3—3 of Figure 2.

The ore car selected for illustrating the present invention comprises frame structure indicated in its entirety by 10 having the usual wheel and axle assemblies 11 adapting the car for travel on the rails 12. To each end of the frame, as more particularly shown in Figure 2, is provided supporting structure including uprights 13, a transverse beam 14 connecting the uprights, and a track 15.

The car body 16 is mounted for rocking movement on the track 15 by means of the arcuate segments 17 secured to the ends of the car body. In order to maintain a definite positioning of the car body with respect to its supporting means the segments 17 have the teeth or cogs 18 formed on their periphery for meshing with the teeth 20 provided on the associated track. The segments 17 are of circular contour, being provided with a pin 21 at the center thereof, forming a projection on the end of the car body and which extends beyond the transverse member 14 of the supporting structure. The above described mounting structure for the car body permits rocking movement of the same from an upright position to a dump position in either direction, and since the segments are in effect geared to their supporting tracks a definite relation between the body and the car frame is maintained which can only be altered by bodily lifting the car body from the tracks. Such movement of the car body, however, is prevented by the location of the pins 21 below the transverse members 14, although this arrangement of elements has other and more important utilitarian purposes as will presently appear.

It is also to be noted that rocking movement of the car body will effect a movement of the pins 21 in a horizontal plane as they are located at the center of the semi-circular segment 17. The means for latching the car body in upright position include a latch 22 pivoted to member 14 at 23 and formed with a latching portion 24 and a downwardly bent end portion terminating in a lug 25. The latch to one end of the car body is disposed so that the latching portion will engage one side of its associated pin while the latch at the other end is oppositely disposed, engaging the opposite side of its associated pin. Brackets 26 are fixedly secured to the frame structure of the car for pivotally supporting a releasing lever 27 for each latch, the lever contacting the underside of the latch and being limited in one direction of rotation by engagement with the depending lug 25. Arm 30 is fixedly secured to each lever at a point somewhat below its upper end and provides convenient means whereby the operator can cause rotation of the lever for lifting the latch to release the engaged pin. For the purpose the arm is bent downwardly at its outer end and terminates well beyond the sides of the car frame. Through contact of the arm with the frame an inoperative position of the lever is secured where the same, although contacting the latch, permits the latch to assume a locking position with respect to its pin.

With each actuating arm 30 in inoperative position it will be seen that the car body is locked in upright position, one latch holding its pin against movement in one direction, while the other latch prevents movement of its pin in an opposite direction. For dumping the car body to the right, as shown in dotted lines in Figure 1, the arm 30 located to the left of the car is lifted causing the lever 27 to in turn lift the latch, releasing the pin. The pins on both ends of the car body are now free to move in a direction toward the right, which takes place through rocking movement of the car body to assume a discharge position on that side of the car. Continued upward movement must be given to arm 30 in order to allow the pin to assume its extreme right hand position since it will be observed that the lever 27 assumes a position in advance of the pin. Position of the parts at full discharge is shown in dotted lines in Figure 1, wherein the lever 27 is located against the stop 25 provided by the depending lug on the latch.

For righting the car body the arm 30 is drawn downwardly, rotating lever 27 counter-clockwise and thereby applying a force against pin 21 in a direction to return the same to its initial position. This application of force on the pin initiates return movement of the car body and as the body is emptying sufficient momentum can be imparted to the same to complete the righting thereof. Return movement of the pin soon makes contact between the lever 27 and pin impossible but the lever can then be used to hold the latch in raised position until the pin is located beyond the latching portion 24 on its extreme left hand position. The arm is then dropped to allow the latch to engage the pin and lock the car body in upright position.

The structure of the present invention is simplified to a considerable extent by locating the pins centrally of the arcuate cradles. Movement of the same in a horizontal plane during dumping and righting operations of the car body is desirable although the design of mechanism disclosed is adaptable to dump cars wherein the car body has rocking movement on cradles of noncircular contour. It is also to be noted that the latching of the car body is accomplished by means of two latch members, whereas, the righting the body is effected through actuation of only one lever which is possible as the cradles are in effect geared to their tracks and the application of a force to one pin will right the body as rotation to an upright position is the only movement the car body can take.

It is to be understood that we do not wish to be limited by the exact embodiment of the device shown, which is merely by way of illustration and not limitation, as various and other forms of the device will of course be apparent to those skilled in the art without departing from the spirit of the invention or scope of the claims.

We claim:

1. In a car of the class described, a frame having supporting means at its ends, a car body, arcuate segments on the body mounting the same for rocking movement on the supporting means, a member projecting from each end of the body, a latch for each member, a pivoted lever engaging the latch for releasing the same, and an arm fixedly secured to the lever for actuating the lever.

2. In a car of the class described, a frame having supporting means at its ends, a car body, arcuate segments on the body mounting the same for rocking movement on the supporting means, a member projecting from each end of the body, a latch for each member, a pivoted lever engaging the latch for releasing the same, and an arm fixedly secured to the lever for actuating the lever, said lever having its pivotal movement in one direction limited by engagement with the latch and in the other direction through engagement of the arm with the supporting means.

3. In a car of the class described, a frame having supporting means at its ends, a car body, arcuate segments on the body mounting the same for rocking movement on the suppporting means, each segment and support having intermeshing teeth, a member projecting from each segment at the center thereof and having movement in a horizontal plane upon rocking movement of the body, a pivoted latch for each member, a pivoted lever for lifting the latch to release the member from engagement therewith, and means on the end of said latch limiting movement of the lever in one direction.

4. In a car of the class described, a frame having supporting means at its ends, a car body, arcuate segments on the body mounting the same for rocking movement on the supporting means, each segment and support having intermeshing teeth, a member projecting from each segment at the center thereof and having movement in a horizontal plane upon rocking movement of the body, a pivoted latch for each member, means for releasing each latch to free the member for lateral movement, and means including a lug on each latch for limiting lateral movement of the member in one direction.

5. A dump car including a frame and a car body rotatable on said frame from an upright to a dump position, a projection extending from each end of the body and having movement in a horizontal plane upon rotation of the body, a latch associated with each projection, one latch preventing movement of its projection in one direction only and the other latch preventing movement of its projection in the opposite direction, and means for releasing each latch independently of the other to free the projection, each latch and its releasing means being constructed and arranged to limit lateral movement of its projection in one direction.

6. A dump car including a frame and a car body rotatable on said frame in either direction from an upright to a dump position, a projection extending from each end of the body respectively and having lateral movement in a horizontal plane upon rotation of the body, a latch associated with each projection, one latch preventing movement of its projection in one direction only and the other latch preventing movement of its projection in the opposite direction, and means associated with each latch operable to release the latch to permit lateral movement of the released projection in a certain direction, said releasing means maintaining a position in advance of said projection, whereby said releasing means has utility in returning the car body from a dump to an upright position.

7. A dump car including a frame and a body rotatable on said frame in either direction from an upright to a dump position, a projection extending from each end of the body respectively and having lateral movement in a horizontal plane upon rotation of the body, a latch associated with each projection, one latch preventing movement of its projection in one direction only and the other latch preventing movement of its projection in the opposite direction, a lever for releasing each latch and for returning the car body to an upright position, and an arm fixedly secured to said lever, said lever and arm being constructed and arranged whereby raising of said arm effects a release of the latch and a downward movement of said arm effects a return of the car body from a dump to an upright position.

8. A dump car including a frame and a car body rotatable on said frame in either direction from an upright to a dump position, a projection extending from each end of the body respectively and having lateral movement in a horizontal plane upon rotation of the body, a latch associated with each projection, one latch preventing movement of its projection in one direction only and the other latch preventing movement of its projection in the opposite direction, each latch having a downwardly directed extension, a pivot lever having contact with said downwardly directed extension and operable to effect an upward movement for releasing the latch upon rotation of the lever in a certain direction.

9. In a car of the class described, a frame having supporting means at its ends, a car body, arcuate segments on the body mounting the same for rocking movement on the supporting means, each segment and support having intermeshing teeth, a member projecting from each end of the body at substantially the center of the arcuate segment, a latch for each member, each latch having a downwardly directed extension, a pivoted lever having contact with said downwardly directed extension and operable to effect an upward movement for releasing the latch upon rotation of the lever in a certain direction.

10. A dump car including a frame having supports at its ends, a car body rotatable in either direction on said supports from an upright to a dump position, a projection extending from the respective sides of the body at substantially the center of rotation of said body, each support having a latch engaging one of said projections to prevent rotation of the body from an upright position, and a lever pivoted to each support for actuating the respective latch, the pivot point of each lever being located below and to one side of the position of its associated projection when the body is latched in upright position.

11. A dump car including a frame and a car body rotatable on said frame from an upright to a dump position, latching means secured to the frame and engaging with means on one end of the body to hold the same in upright position, and releasing means for said latch, said releasing means and its associated latch co-acting with each other and with said means on the end of the body to provide a stop for preventing further rotative movements of the body beyond a dump position.

12. A dump car including a frame and a car body rotatable on said frame from an upright to a dump position, a projection extending from one end of the body and having movement horizontally upon rotation of the body, a latch associated with said projection, and releasing means for said latch, said releasing means having engagement with its associated projection when the car body is in full dump position and being positioned to the outside of said projection where said releasing means may operate to initiate return inward movement of the projection and righting of the car body.

13. A dump car including a frame and a car body rotatable on said frame from an upright to a dump position, a projection extending from one end of the body and having movement horizontally upon rotation of the body, a latch associated with said projection, and releasing means for said latch, said releasing means and its associated latch coacting with each other and with said projection to provide a stop for preventing further rotative movements of the car body beyond a dumping position.

14. In a car of the class described, a frame having supporting means at its ends, a car body, arcuate segments on the body mounting the same for rocking movement on the supporting means, a member projecting from each end of the body, a latch for each member, a pivoted lever engaging each latch and effecting a release of the latch when rotated in a certain direction, an arm fixedly secured to the lever and extending to one side of the car providing means accessible to the operator for actuating the lever, each lever being adapted to engage its projection after release thereof and when the car body is in full dump position and said lever having association with the projection whereby the lever may function to initiate return inward movement of the projection and righting of the car body.

15. In a car of the class described, a frame having supporting means at its ends, a car body, arcuate segments on each end of the body mounting the same for rocking movement on the supporting means, each segment and support having intermeshing teeth, a member projecting from each end of the body and having movement in a horizontal plane upon rocking movement of the body, a latch for each member, and releasing means therefor including a pivoted lever, said lever when holding its latch released to a maximum extent assuming a position in advance of its projection and having contact with its projection when the car body assumes a full dump position.

16. In a car of the class described, a frame having supporting means at its ends, a car body, arcuate segments on the body mounting the same for rocking movement on the supporting means, each segment and support having intermeshing teeth, a member projecting from each end of the body and having movement in a horizontal plane upon rocking movement of the body, a latch for each member, and releasing means for each latch including a pivoted lever operating to release the latch when rotated in one direction, whereby said car body is free to rotate in a certain direction on said supporting means and to assume a dump position, said pivoted lever being adapted to have contact with its associated member when the car body assumes a full dump potion, to initiate return movement of the car body.

FRED R. WEDLAKE.
HANNIBAL HART.